(12) United States Patent
Graham

(10) Patent No.: US 8,294,609 B2
(45) Date of Patent: Oct. 23, 2012

(54) SYSTEM AND METHOD FOR REDUCTION OF POINT OF ORIGIN ERRORS

(75) Inventor: Timothy David Graham, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 289 days.

(21) Appl. No.: 12/768,965

(22) Filed: Apr. 28, 2010

(65) Prior Publication Data

US 2011/0267218 A1 Nov. 3, 2011

(51) Int. Cl.
G01S 7/42 (2006.01)
G01S 13/00 (2006.01)

(52) U.S. Cl. .............. 342/90; 372/13; 372/89; 372/95

(58) Field of Classification Search .............. 342/13, 342/89–97
See application file for complete search history.

(56) References Cited

U.S. PATENT DOCUMENTS

| 3,063,047 | A | * | 11/1962 | Steele | 342/107 |
|---|---|---|---|---|---|
| 3,848,509 | A | * | 11/1974 | Corn | 89/41.22 |
| 4,794,235 | A | * | 12/1988 | Burke et al. | 235/412 |
| 5,051,751 | A | * | 9/1991 | Gray | 342/107 |
| 5,781,505 | A | * | 7/1998 | Rowland | 367/127 |
| 5,796,474 | A | * | 8/1998 | Squire et al. | 356/152.1 |
| 5,912,640 | A | * | 6/1999 | Bradford et al. | 342/99 |
| 5,912,862 | A | * | 6/1999 | Gustavsen et al. | 367/129 |
| 5,930,202 | A | * | 7/1999 | Duckworth et al. | 367/127 |
| 6,057,915 | A | * | 5/2000 | Squire et al. | 356/139.05 |
| 6,278,401 | B1 | * | 8/2001 | Wigren | 342/195 |
| 6,498,580 | B1 | * | 12/2002 | Bradford | 342/90 |
| 7,205,520 | B1 | * | 4/2007 | Busse et al. | 250/203.6 |
| 7,248,210 | B2 | * | 7/2007 | Bruce et al. | 342/175 |
| 7,492,308 | B2 | * | 2/2009 | Benayahu et al. | 342/52 |
| 7,764,185 | B1 | * | 7/2010 | Manz et al. | 340/601 |
| 7,825,853 | B2 | * | 11/2010 | Bruce et al. | 342/175 |
| 2005/0012657 | A1 | * | 1/2005 | Mohan | 342/133 |
| 2006/0092075 | A1 | * | 5/2006 | Bruce et al. | 342/175 |
| 2007/0040062 | A1 | * | 2/2007 | Lau et al. | 244/3.16 |
| 2009/0029672 | A1 | * | 1/2009 | Manz | 455/404.2 |
| 2009/0174589 | A1 | * | 7/2009 | Moraites | 342/14 |
| 2009/0309781 | A1 | * | 12/2009 | Tietjen et al. | 342/52 |
| 2010/0027840 | A1 | * | 2/2010 | Roberts et al. | 382/103 |

* cited by examiner

Primary Examiner — Jack W Keith
Assistant Examiner — Peter Bythrow
(74) Attorney, Agent, or Firm — George R. McGuire; Blaine T. Bettinger; Bond Schoeneck & King

(57) ABSTRACT

A method of using a discriminant analysis and Kalman filter cascade to improve the accuracy of point of origin solutions. Tracking information about a potential target is utilized by an initial discrimination function to classify the target as a projectile. Using that information, the output of a first Kalman filter is fed into an additional discrimination function to further classify the type or sub-class of the projectile. A second Kalman filter can employ type-specific information to obtain a point of origin solution with increased efficiency and accuracy.

20 Claims, 5 Drawing Sheets

SYSTEM AND METHOD FOR REDUCTION OF POINT OF ORIGIN ERRORS

BACKGROUND OF THE INVENTION

1. Field of the Invention

The present invention relates to enhancing the accuracy of point of origin estimates, and, more specifically, to a method of using a Kalman filter cascade to improve point of origin accuracy.

2. Description of the Related Art

A mortar is a projectile that launches explosive shells in high trajectories to penetrate enemy defenses and inflict both damage and casualties. Mortar shells can be launched from light-weight portable weapons and can be efficiently moved from location to location to avoid counterattack.

Quickly and accurately determining the point of origin of an in-flight projectile such as a mortar has the potential to greatly enhance defensive capabilities. With an accurate point of origin estimation, a counterattack can commence before the enemy can move the weapon.

Radar is typically used to detect and track in-flight projectiles. The United States AN/TPQ-48 lightweight counter-mortar radar, for example, is a 360-degree radar used to detect, locate, and report enemy indirect fire. Optimally, the counter-mortar radar is designed to determine both point of origin and weapon type and subtype within seconds, allowing rapid and effective countermeasures.

All counter-fire radars employ some type of algorithm to determine projectile point of origin. Predecessors to the AN/TPQ-48 counter-mortar radar, for example, typically use a Kalman filter-based weapon state estimation routine that takes into account ballistic flight characteristics. A Kalman filter is an optimal data processing algorithm used to obtain the best estimate of a variable using noisy measurements. By combining measurements with information about the sensor and about the overall system, the algorithm returns an estimate with minimized error.

Despite the use of algorithms such as the Kalman filter, current point of origin estimates remain error-prone and inaccurate. An improved algorithm is needed to increase the accuracy of point of origin estimates to support counter-attack capabilities.

BRIEF SUMMARY OF THE INVENTION

It is therefore a principal object and advantage of the present invention to provide a method to improve the accuracy of projectile point of origin estimates.

Other objects and advantages of the present invention will in part be obvious, and in part appear hereinafter.

In accordance with the foregoing objects and advantages, the present invention provides a method for point of origin calculation, the method comprising: (1) detection of a target; (2) classification of the target as a projectile; (3) a first Kalman filter calculation; (4) optionally further classifying the type of projectile; (5) a second Kalman filter calculation; and (6) estimating the target's point of origin.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
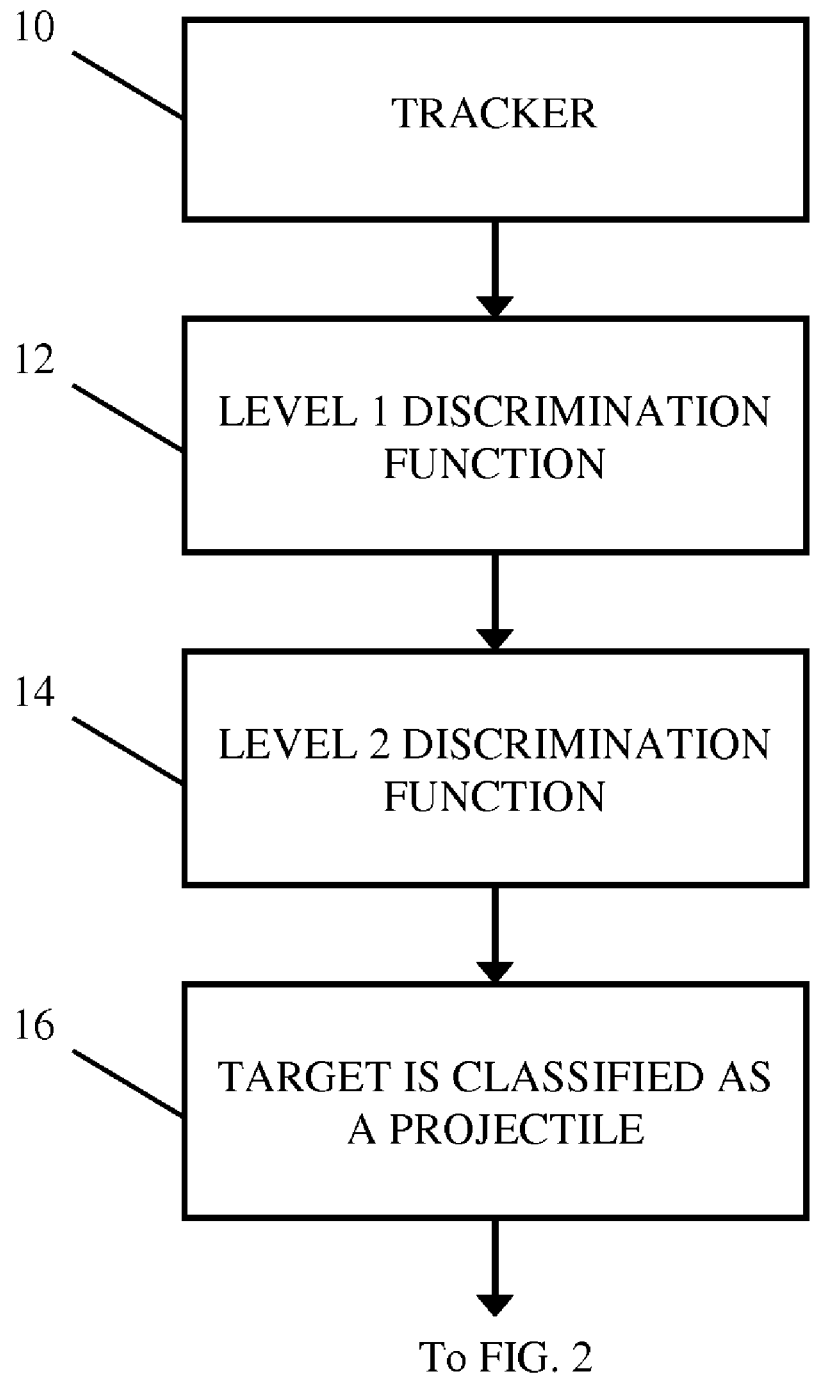
FIG. 1 is a flowchart of initial projectile classification.
Figure 2:
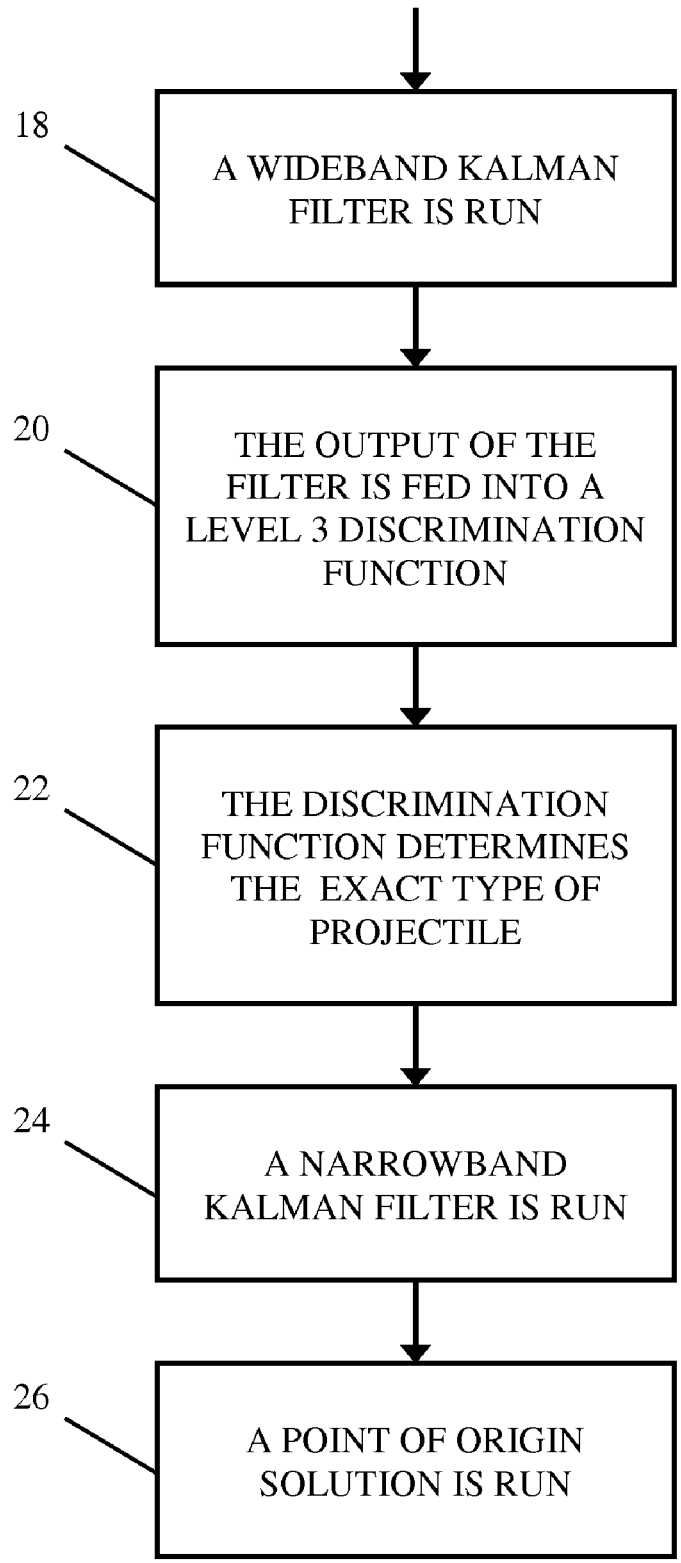
FIG. 2 is a flowchart of secondary projectile classification and subsequent point of origin calculation according to one embodiment of the present invention.

Referring now to the drawings, there is seen in FIG. 1 a flowchart of an initial projectile classification mechanism which is common in existing fire-finding radars and is utilized by one embodiment of the present invention. As an initial step 10, a radar gathers information about a potential in-flight target. After identifying the potential target, the radar tracker gathers information about the target, including spatial coordinates, speed, and heading. One or more of these consecutive radar observations are gathered into a "track," the observed course of the target.

The track is fed into a level 1 discrimination function, shown in step 12. The discrimination function uses discriminant analysis to attempt classify a potential target as a projectile or non-projectile. The discriminant analysis can be based on statistics or machine learning to identify characteristics that differentiate categories or classes of objects such as in-flight targets. In a preferred embodiment, the first level of discrimination uses basic target parameters such as track length, velocity, height, probability of detection, and target size. The target size, or Radar Cross Section ("RCS") is calculated by taking a priori knowledge of the radar system (including information about power transmitted, antenna gain, and system losses) in combination with the target range and received power level and solving the following radar range equation:

$$RCS = \frac{(4\pi)^3 \cdot SNR \cdot R^4 \cdot kT \cdot L_t \cdot L_{sp} \cdot L_{az}}{P_t \cdot N_p \cdot T_p \cdot G_t \cdot G_r \cdot \lambda^2}$$

where "SNR" equals the signal-to-noise ratio; "R" is the range of the target; "kT" is the product of Boltzman's constant and system temperature; "$L_t$" is the transmit loss; "$L_{sp}$" is the signal processor loss; "$L_{az}$" is the azimuth beam shape loss; "$P_t$" is the transmit power; "$N_p$" is the number of pulses in a dwell and is pulled from the dwell command; "$T_p$" is the pulse width, which is pulled from the dwell command; "$G_t$" is the transmit antenna gain, and $G_r$ is the receive antenna gain; and "$\lambda$" is the wavelength.

The track information and the results of the first discrimination function can then be utilized by a second discrimination function to further classify the projectile, as shown in step 14. This can include identification of the type of projectile, such as mortar, rocket, or artillery. As each level of discrimination, the calculations are more accurate and require more intensive processing. As a result, the system utilizes two levels of discriminant analysis so that the complex algorithms are not performed on every track (such as clutter, birds, etc. . . . ) and overwhelm the processor.

In a preferred embodiment, the second level of discrimination in step 14 uses polynomial fits to the spatial dimensions of the radar detections. The fit data is then used to estimate the initial track parameters more accurately by smoothing out the inaccuracies associated with the raw detections.

Following the two levels of discrimination, the resulting information can then be directed to a first Kalman filter. In a second embodiment, information about the potential target can be utilized by the present invention without first applying discriminant analysis to classify the target.

In step 18, a first Kalman filter is run using the radar information and calculated projectile type. This initial Kalman filter can optionally use a high process noise model and a general drag model so that it doesn't diverge on a wide variety of targets. In a preferred embodiment, the Weapon State Estimator consists of a 7-state Kalman filter to smooth the measured points, and extrapolate the target's trajectory to the ground for Launch and Impact point estimation. The Kalman state vector consists of Cartesian position, velocity, and a drag term denoted "ballistic coefficient":

$$\vec{x} = [x \dot{x} y \dot{y} z \dot{z} \beta]^T$$

The state vector is initialized in the Wide Band Kalman by fitting the measured data points to a quadratic curve, and using the resultant coefficients to compute an estimate of initial state of position and velocity. The ballistic coefficient is initialized to a constant value read from a configuration file. Variance for each radar coordinate (range, azimuth, elevation) is computed from the measured signal-to-clutter ratio ("SCR") of each radar detection in the track. The extrapolation equation for the Kalman filter are as follows:

$$\vec{x}(k|k-1) = \phi \cdot \vec{x}(k-1|k-1) + \vec{u}$$

and $$P(k|k-1) = \phi \cdot P(k-1|k-1) \cdot \phi^T + Q$$

where the transition matrix is:

$$\phi = \phi(k, k-1) = \begin{bmatrix} 1 & \Delta & 0 & 0 & 0 & 0 & d\Delta_2 \dot{x} \\ 0 & 1 & 0 & 0 & 0 & 0 & d\Delta \dot{x} \\ 0 & 0 & 1 & \Delta & 0 & 0 & d\Delta_2 \dot{y} \\ 0 & 0 & 0 & 1 & 0 & 0 & d\Delta \dot{y} \\ 0 & 0 & 0 & 0 & 1 & \Delta & d\Delta_2 \dot{z} \\ 0 & 0 & 0 & 0 & 0 & 1 & d\Delta \dot{z} \\ 0 & 0 & 0 & 0 & 0 & 0 & 1 \end{bmatrix}$$

The process noise, Q, is defined as:

$$Q = \begin{bmatrix} x_q & 0 & 0 & 0 & 0 & 0 & 0 \\ 0 & \dot{x}_q & 0 & 0 & 0 & 0 & 0 \\ 0 & 0 & y_q & 0 & 0 & 0 & 0 \\ 0 & 0 & 0 & \dot{y}_q & 0 & 0 & 0 \\ 0 & 0 & 0 & 0 & z_q & 0 & 0 \\ 0 & 0 & 0 & 0 & 0 & \dot{z}_q & 0 \\ 0 & 0 & 0 & 0 & 0 & 0 & B_q \end{bmatrix}$$

where the diagonal elements are the desired amount of additional covariance (process noise) to be added to the filter and:

$$d = C_D \rho v$$

$$\Delta = t_k - t_{k-1}$$

$$v = \sqrt{\dot{x}^2 + \dot{y}^2 + \dot{z}^2}$$

$$\Delta_2 = \Delta^2/2$$

Here, d is the drag term incorporating the drag coefficient $C_D$, the air density $\rho$, and the projectile velocity v. The driving term in the state prediction equation is:

$$\vec{u} = \begin{bmatrix} -c\Delta_2 \dot{y} \\ -c\Delta \dot{y} \\ -c\Delta_2 \dot{x} \\ -c\Delta \dot{x} \\ -g\Delta_2 \\ -g\Delta \\ 0 \end{bmatrix}$$

where:

$$c = C_{drift} v_h / v^2$$

$$v_h = \sqrt{\dot{x}^2 + \dot{y}^2}$$

The pseudo-Cartesian measurement vector z is related to the state vector by the observation matrix H:

$$\vec{z}(k) = H(k) \cdot \vec{x}(k) + n(k)$$
$$= [x_m \ y_m \ z_m]^T$$
$$= [r_m \sin\alpha_m \cos\varepsilon_m \ r_m \cos\alpha_m \cos\varepsilon_m \ r_m \sin\varepsilon_m]^T$$

The observation matrix is then:

$$H = \begin{bmatrix} 1 & 0 & 0 & 0 & 0 & 0 & 0 \\ 0 & 0 & 1 & 0 & 0 & 0 & 0 \\ 0 & 0 & 0 & 0 & 1 & 0 & 0 \end{bmatrix}$$

The state update equation is then:

$$\vec{x}(k|k) = \vec{x}(k|k-1) + K(k) \cdot \vec{\eta}(k)$$

where K is the Kalman gain and the residual is:

$$\vec{\eta}(k) = \vec{z}(k) - H \cdot \vec{x}(k|k-1)$$

The gain is given by:

$$K(k) = P(k|k-1) \cdot H \cdot [H \cdot P(k|k-1) \cdot H^T + R(k)]^{-1}$$

and the updated error covariance is:

$$P(k|k) = [I - K(k) \cdot H] \cdot P(k|k-1)$$

Figure 3:
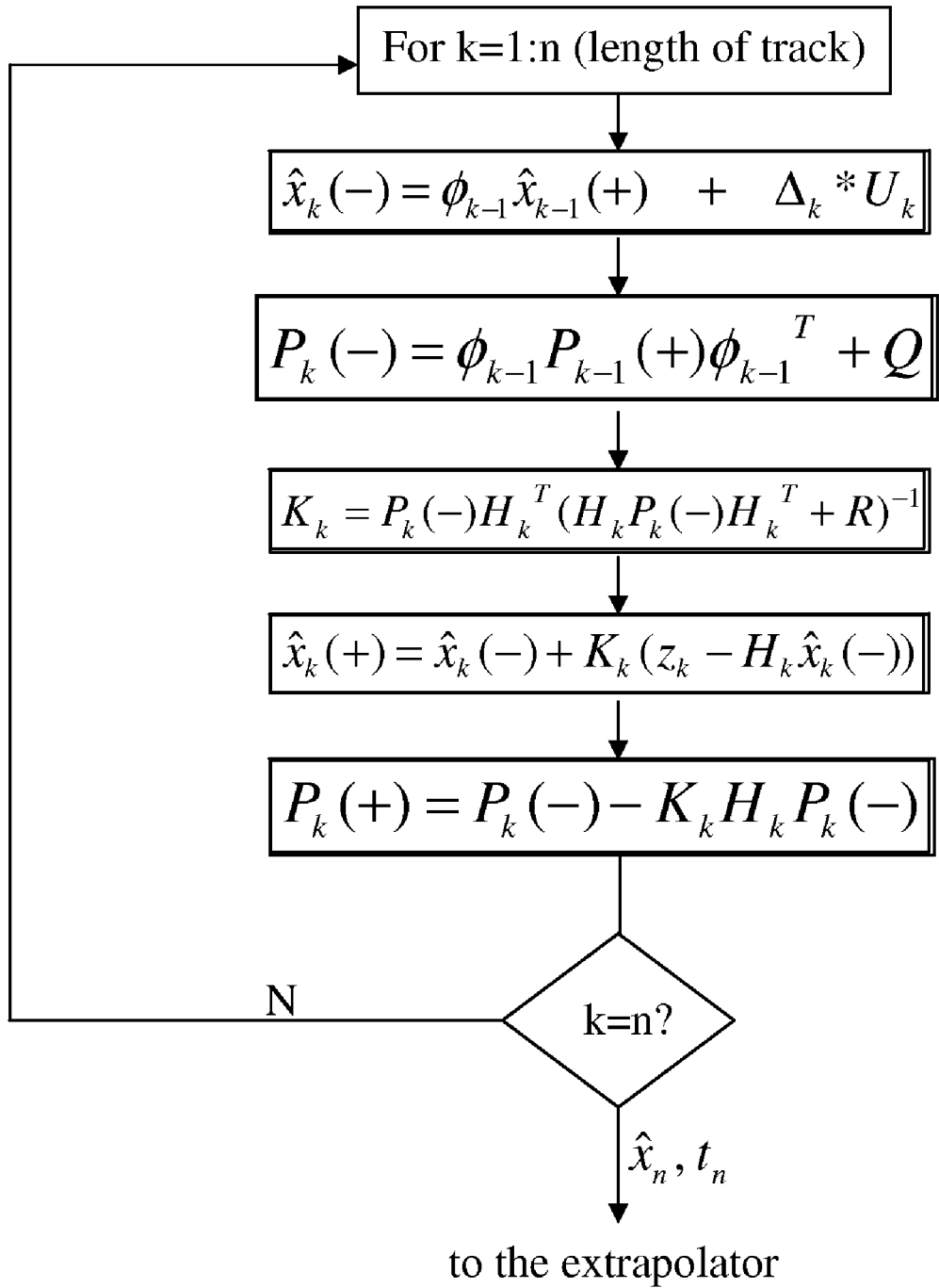
FIG. 3 is a flowchart of Kalman smoother flow according to one embodiment of the present invention.
Figure 4:
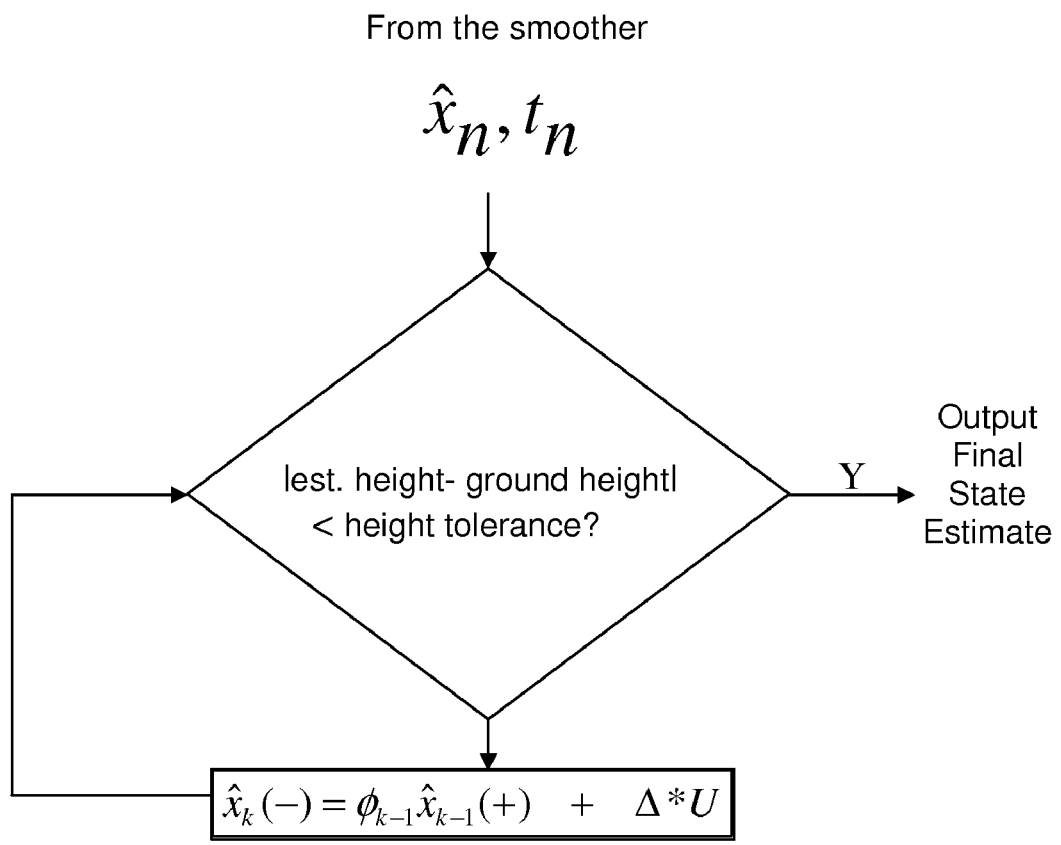
FIG. 4 is a flowchart of a Kalman extrapolator according to one embodiment of the present invention.

FIG. 3 depicts a flowchart of the subsequent Kalman smoother flow according to one embodiment of the present invention. FIG. 4 depicts a flowchart of a Kalman extrapolator which processes the output of the previous smoother step.

In another embodiment of the present invention, the system can use specific environmental measurements such as temperature, humidity, wind speed, wind direction, air density, air pressure, temperature gradient, pressure gradient, or any other additional algorithms to further refine the drag model or Kalman filter calculations.

In step 20, the output of the first Kalman filter is fed into a third discrimination function. This discrimination function uses the first Kalman filter state vector output—including velocity, quadrant elevation, and ballistic coefficient—along with a calculated radar cross-section to further classify the projectile into different sub-classes, as shown in step 22. This can include classification such as caliber estimation or rocket type, among many others, depending on the programmed or learned capabilities of the system.

Figure 5:
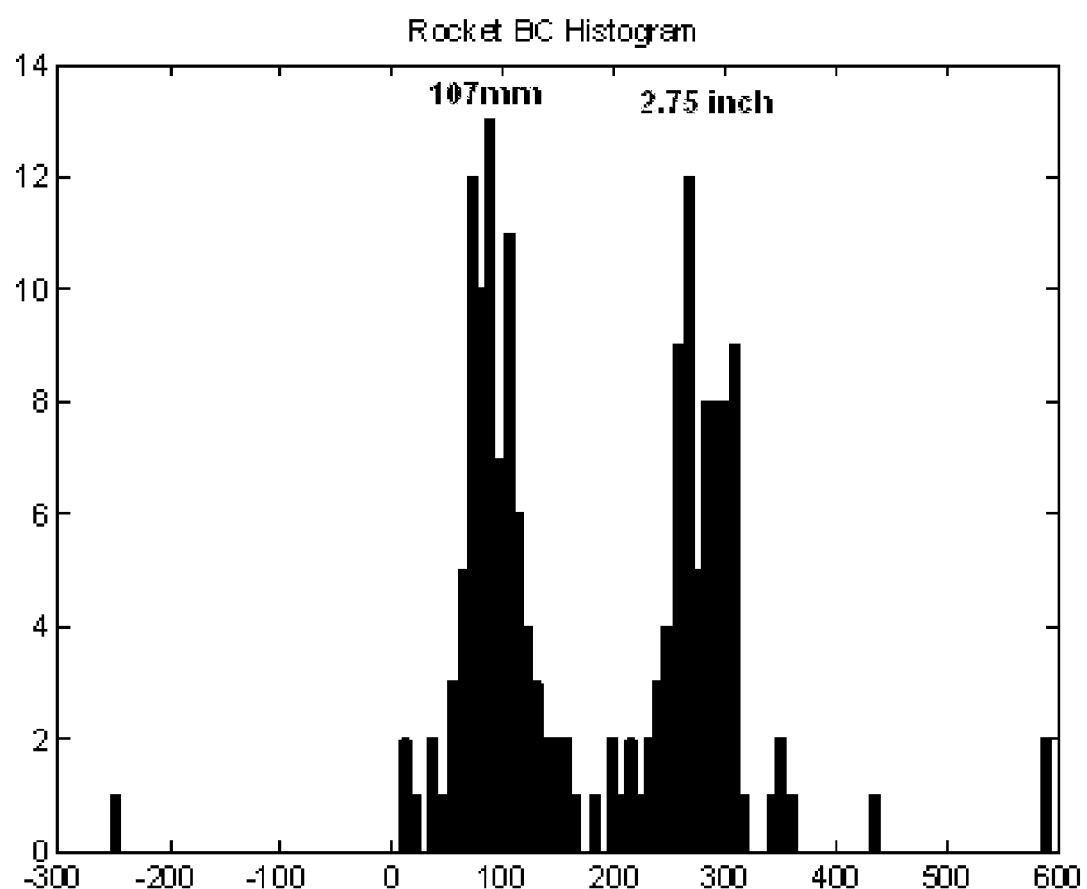
FIG. 5 is an example of the ballistic coefficient tracked in the $7^{th}$ state of the Kalman filter for samples of two rocket targets.

FIG. 5 is a graph of the ballistic coefficient tracked in the 7th state of the Kalman filter is shown below for samples of two rocket targets (107 mm and 70 mm (2.75")). This parameter is easily separable for these targets to be used for typing purposes. The covariance of the filter is also monitored as non-ballistic targets fed through a filter with a ballistic forcing function will tend to have larger filter covariance values. This is exploited for the purposes of classification.

In step 24, the previous information is utilized by a second Kalman filter. Based on the information obtained from the prior discrimination functions, this Kalman filter can optionally use a type-specific ballistic model to smooth the track and extrapolate a point of origin. Additionally, a type-specific drag model can further refine the point of origin solution. The second filter uses less process noise in the filter, which provides a higher degree of smoothing and results in increased accuracy. Because the type-specific drag model matches the observed data so closely, the smaller amount of process noise does not make the filter diverge.

The second Kalman filter uses at least the smoothed state vector from the first Kalman filter. If the third level discrimination function calculates the weapon type or sub-type with sufficient confidence, the type-specific ballistic parameters are fed to the second Kalman filter, which will use reduced process noise to produce more smoothing. In one embodiment the second Kalman filter benefits from at least a better initialization from the first Kalman filter, but gets the largest gain from using the type or sub-type specific drag model only if they system can accurately classify the projectile.

In a preferred embodiment, the Kalman filter cascade estimates a point of origin solution within seconds of the initial radar detection. Once calculated, the estimated point of origin can then be directed to a warning system, a counter-attack system, or another counter-measure systems.

Testing this method on actual projectiles yields improvements in target location error of 2-15% depending on projectile type. The further from the general drag model the specific projectile is, the more benefit this algorithm produces. In this case, rocket targets, which can differ greatly in drag properties see the largest improvement in 50% circular error probability.

Although the present invention has been described in connection with a preferred embodiment, it should be understood that modifications, alterations, and additions can be made to the invention without departing from the scope of the invention as defined by the claims.

What is claimed is:

1. A method for extrapolating the point of origin of a projectile, the method comprising:
   receiving, at a processor, data about a target from a radar;
   classifying said target by performing a first discriminant function analysis of said received data using said processor;
   performing, by said processor, a second discriminant function analysis of the analyzed data to create a first output comprising information about said radar target, wherein said second discriminant function is only performed if said first discriminant function classifies said target as a projectile;
   calculating at least a first value of said projectile by performing, using said processor, a first Kalman filter algorithm using at least the data from said second discriminant function analysis;
   performing, by said processor, a third discriminant function analysis of said at least a first value of said projectile to create a second output;
   performing, by said processor, a second Kalman filter algorithm using at least said first value of said projectile to create a third output; and
   using said third output to extrapolate a point of origin of said target.

2. The method of claim 1, wherein said method further comprises:
   predicting a point of impact.

3. The method of claim 1, wherein said method further comprises:
   sending at least said extrapolated point of origin to a downstream application.

4. The method of claim 3, wherein said downstream application is a warning system.

5. The method of claim 3, wherein said downstream application is a counter-measure system.

6. The method of claim 1, wherein the step of calculating at least a first value of said projectile by performing a first Kalman filter algorithm comprises the steps of:
   estimating at least an initial state of position and at least an initial state of velocity by fitting the received data into a quadratic curve;
   initializing the ballistic coefficient to a constant value; and
   computing the variance for at least a first radar coordinate.

7. The method of claim 1, wherein said method further comprises:
   measuring at least a first environmental variable, wherein said environmental variable is used by said first or second Kalman filter algorithm.

8. The method of claim 7, wherein said environmental variable is wind speed.

9. The method of claim 8, wherein said environmental variable is selected from the group consisting of wind speed, wind direction, air temperature, air density, and air pressure.

10. The method of claim 1, wherein said method further comprises:
    calculating at least a first radar cross-section, wherein said at least first radar cross-section is used in said third discriminant function analysis.

11. The method of claim 1, wherein said second output comprises information about the target's caliber.

12. The method of claim 1, wherein said Kalman filter algorithm comprises a type-specific ballistic model.

13. The method of claim 1, wherein said Kalman filter algorithm comprises a type-specific drag model.

14. A method for extrapolating the point of origin of a projectile, the method comprising:
    receiving, at a processor, data about a target from a radar;
    performing, by said processor, a first discriminant function analysis of the received data to create a first output comprising information about said radar target;
    calculating at least a first value of said projectile by performing, by said processor, a first Kalman filter algorithm using at least the data from said first discriminant function analysis;
    performing, by said processor, a second discriminant function analysis of said at least a first value of said projectile to create a second output;
    performing, by said processor, a second Kalman filter algorithm using at least said first value of said projectile to create a third output; and using said third output to extrapolate a point of origin of said projectile.

15. The method of claim 14, wherein said method further comprises:
predicting a point of impact.

16. The method of claim 14, wherein said method further comprises:
sending at least said extrapolated point of origin to a downstream application.

17. The method of claim 15, wherein said method further comprises:
sending at least said point of impact to a downstream application.

18. The method of claim 14, wherein said method further comprises:
measuring at least a first environmental variable, wherein said environmental variable is used by said first or second Kalman filter algorithm.

19. The method of claim 14, wherein said method further comprises:
calculating at least a first radar cross-section, wherein said at least first radar cross-section is used in said second discriminant function analysis.

20. The method of claim 14, wherein said first output comprises information about the target's caliber.

\* \* \* \* \*

UNITED STATES PATENT AND TRADEMARK OFFICE
CERTIFICATE OF CORRECTION

| | |
|---|---|
| PATENT NO. | : 8,294,609 B2 |
| APPLICATION NO. | : 12/768965 |
| DATED | : October 23, 2012 |
| INVENTOR(S) | : Timothy David Graham |

It is certified that error appears in the above-identified patent and that said Letters Patent is hereby corrected as shown below:

Column 1,

Please add the following new paragraphs after Paragraph 1.

> STATEMENT REGARDING FEDERALLY SPONSORED RESEARCH OR DEVELOPMENT
>
> This invention was made with government support under grant number W1597T-05-C-P004 awarded by the Department of Defense. The government has certain rights in the invention.

Signed and Sealed this
Nineteenth Day of March, 2013

Teresa Stanek Rea
*Acting Director of the United States Patent and Trademark Office*